(12) United States Patent
Aggarwal et al.

(10) Patent No.: US 10,713,090 B2
(45) Date of Patent: Jul. 14, 2020

(54) CONTEXT AWARE PRIORITIZATION IN A DISTRIBUTED ENVIRONMENT USING TIERED QUEUE ALLOCATION

(71) Applicant: American Express Travel Related Services Company, Inc., New York, NY (US)

(72) Inventors: Anupam Aggarwal, Noida (IN); Abhinav B. Bali, Gurgaon (IN); Nitin Mahesh, Delhi (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 147 days.

(21) Appl. No.: 15/982,781

(22) Filed: May 17, 2018

(65) Prior Publication Data

US 2019/0354398 A1    Nov. 21, 2019

(51) Int. Cl.
| | |
|---|---|
| *G06F 9/48* | (2006.01) |
| *H04L 29/08* | (2006.01) |
| *H04L 12/26* | (2006.01) |
| *G06F 9/50* | (2006.01) |
| *H04L 29/06* | (2006.01) |
| *G06F 16/182* | (2019.01) |

(52) U.S. Cl.
CPC .......... *G06F 9/4881* (2013.01); *G06F 9/5083* (2013.01); *G06F 16/183* (2019.01); *H04L 43/0817* (2013.01); *H04L 67/02* (2013.01); *H04L 67/1097* (2013.01); *H04L 67/42* (2013.01)

(58) Field of Classification Search
CPC .... G06F 16/183; G06F 9/4881; G06F 9/5083; H04L 67/1097
See application file for complete search history.

(56) References Cited

U.S. PATENT DOCUMENTS

| | | | | |
|---|---|---|---|---|
| 7,872,769 | B2 * | 1/2011 | Akashi | G06F 3/1213 358/1.14 |
| 8,725,546 | B2 * | 5/2014 | Rai | G06Q 10/06 705/7.12 |
| 9,176,774 | B2 * | 11/2015 | Druyan | G06F 9/5038 |
| 9,836,711 | B2 * | 12/2017 | Hanafusa | G06Q 10/06316 |
| 10,303,512 | B2 * | 5/2019 | Baker | G06F 9/5038 |
| 2004/0215780 | A1 * | 10/2004 | Kawato | H04L 47/15 709/226 |
| 2007/0021998 | A1 * | 1/2007 | Laithwaite | G06Q 10/06 705/7.13 |
| 2008/0066070 | A1 * | 3/2008 | Markov | G06F 9/4818 718/103 |

(Continued)

*Primary Examiner* — Mohamed A. Wasel
(74) *Attorney, Agent, or Firm* — Thomas Horstemeyer, LLP

(57) ABSTRACT

Systems and methods for allocating jobs in a distributed file system queue are provided. The system may receive a job request and intelligently divide the job request into one or more logical job stages. Each job stage may be assigned a stage weight based on historical data corresponding to each job stage, such as job stage computing requirements, job stage data outputs, and the like. The system may assign each job stage to a job queue n the distributed file system based on the stage weight and the current computing availability of each job queue. The system may execute each job stage in the assigned job queue to complete the job request.

20 Claims, 4 Drawing Sheets

(56) References Cited

U.S. PATENT DOCUMENTS

| | | | |
|---|---|---|---|
| 2012/0198462 A1* | 8/2012 | Cham | G06F 9/5038 |
| | | | 718/103 |
| 2013/0346994 A1* | 12/2013 | Chen | G06F 9/5044 |
| | | | 718/104 |
| 2017/0249574 A1* | 8/2017 | Knijnik | G06Q 10/06313 |

* cited by examiner

CONTEXT AWARE PRIORITIZATION IN A DISTRIBUTED ENVIRONMENT USING TIERED QUEUE ALLOCATION

FIELD

The disclosure generally relates to distributed data environments, and more specifically, to systems and methods for allocating jobs in a distributed file system queue.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. However, traditional relational databases may not be capable of sufficiently handling the size of the tables that big data creates. As a result, the massive amounts of data in big data sets may be stored in numerous different data storage formats in various locations to service diverse jobs, application parameters, and use case parameters.

Computing nodes in a distributed file system may be used to receive, process, and store data, and to run jobs to leverage the data. Computing nodes may also be logically partitioned to form various job queues configured to execute jobs. Jobs are typically assigned to queues based on initial configuration settings. For example, under a single queue setting, jobs may be executed sequentially regardless of complexity or queue resources needed. In a fair share methodology, jobs may be executed simultaneously and assigned queue resources such that all jobs get an equal share of the queue resources, regardless of complexity or queue resources needed.

SUMMARY

Systems, methods, and articles of manufacture (collectively, the "system") for allocating jobs in a distributed file system queue is disclosed. The system may receive a job request. The system may divide the job request in to a plurality of job stages based on job metadata, wherein each job stage comprises a logical partition of the job request. The system may determine a stage weight for each job stage and an infrastructure capability, wherein the stage weight is based on the job metadata. The system may assign each job stage to a job queue based on the stage weight and the infrastructure capability. The system may transmit to a distributed file system each job stage and associated job queue assignment to a job scheduling server, wherein the job scheduling server is configured to transfer each job stage to a job queue based on the job queue assignment.

In various embodiments, a resource manager may be configured to monitor execution of each job stage to determine at least one of a job stage completion time, a job stage required memory, a job stage data output size, or a job state data output network flow. The job metadata may comprise a job stage dependency, the job stage completion time, the job stage required memory, the job stage data output size, and/or the job stage data output network flow. In various embodiments, the resource manager may also be configured to monitor each job queue during execution of the assigned job stage to determine at least one of a current queue resource availability or a number of jobs being executed on each job queue. The infrastructure capability may comprise the current queue resource availability and/or the number of jobs being executed on each job queue.

In various embodiments, each job queue may comprise a virtual partition of one or more computing nodes in the distributed file system. The job request may comprise a data processing algorithm, a machine learning model, or a statistical model.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
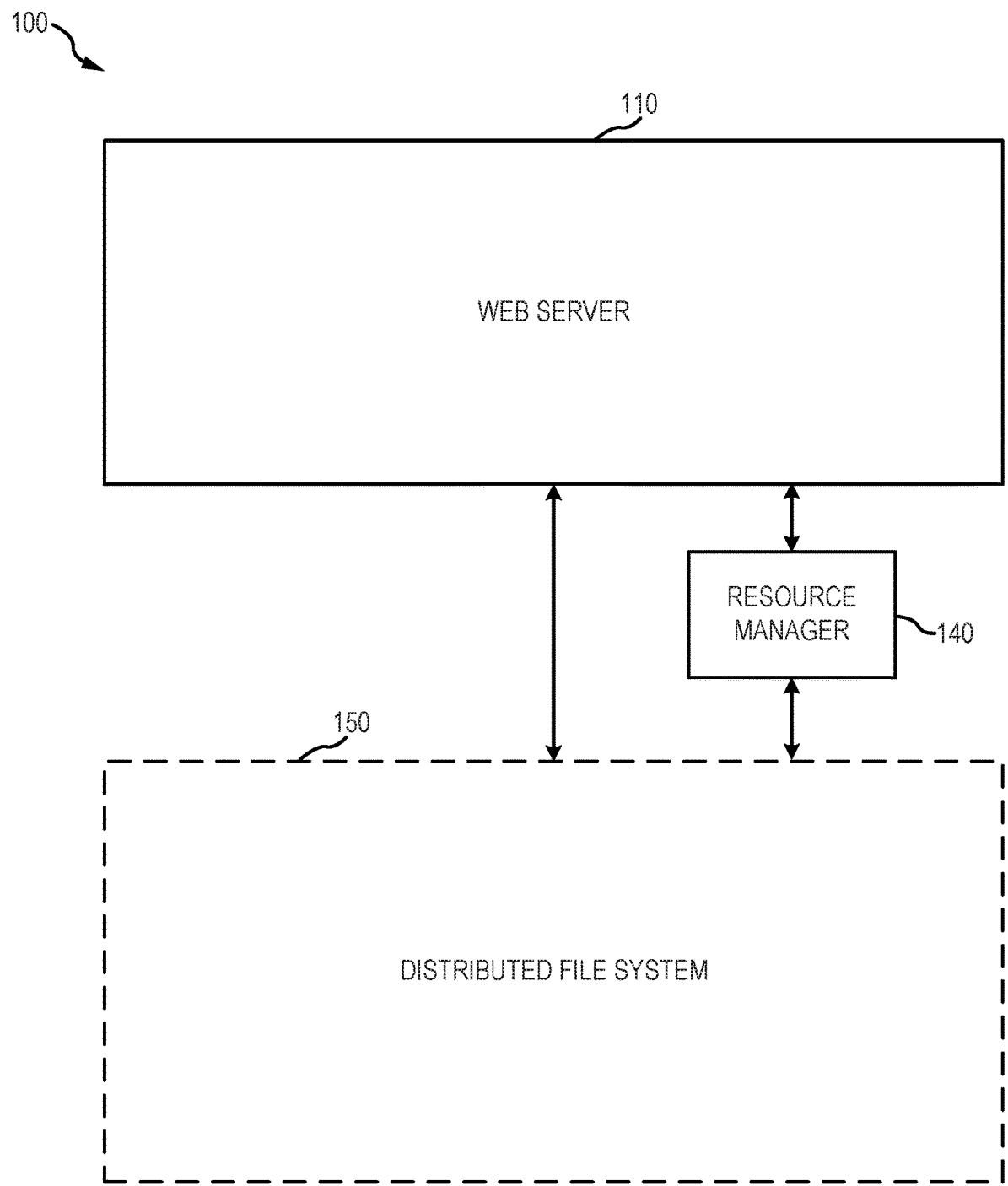
FIG. 1 is a block diagram illustrating a system for allocating jobs in a distributed file system queue, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide a process for allocating jobs in a distributed file system queue. The system may prioritize the assignment and execution of jobs (and/or job stages) in the distributed file system (e.g., a distributed environment) using a tiered queue allocation. For example, the system may intelligently divide jobs into a plurality of jobs stages and assign each individual job stage a stage weight based on a historical analysis of how long each job stage takes to complete, the resources consumed by each job stage (e.g., memory needed), the data output from each completed job stage (e.g., data output size), and the network capacity needed to transmit each data output (e.g., data output network flow). The system may further determine the resource availability across all queues in the system, and the current number of active jobs running on each queue (or across all queues). Based on the stage weight of each job stage and the resource availability of the queues, the system may intelligently assign queues to each job stage for execution.

The system improves the functioning of the computer and/or distributed file system. For example, the system enables the optimal usage of cluster resources by automating the delegation and assignment of queue resources intelligently and progressively for each job stage, and/or by effectively distributing queue resources for executing jobs. As a result, consumption of queue resources may be evenly distributed across all queues in the system, jobs may execute more efficiently, and processing time from the time the job is allocated to the time the job is executed decreases. The system may also intelligently parse job logic based on interdependencies of job stages to concurrently process jobs across queues in parallel execution, thus avoiding overloading the resources of a given queue. In that regard, the system may contextually prioritize the execution of jobs and job stages in the distributed file system.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data" may include encompassing information such as commands, queries, files, data for storage, information, and the like in digital or any other form.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge ("ROC"), from summaries of charges ("SOC"), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. ROC data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a summary of charges ("SOC"). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

In various embodiments, and with reference to FIG. 1, a system 100 for allocating jobs in a distributed file system queue is disclosed. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

System 100 may comprise one or more of a web server 110, a resource manager 140, and/or a distributed file system 150. The various systems, environments, processors, servers, databases, managers, and the like in system 100 may be in direct logical communication with each other via a bus, network, and/or through any other suitable means, or may be individually connected as described further herein. For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, web server 110 may be in electronic communication with resource manager 140 and/or distributed file system 150. Web server 110 may comprise any suitable type of web server, such as, for example, an Apache Tomcat® server. Web server 110 may comprise any suitable combination of hardware, software, databases, or the like. For example, web server 110 may comprise a computer-based system, processor, server, pooled servers, or the like capable of receiving and transmitting data, performing various operations, and/or instructing various system 100 components as discussed further herein. In various embodiments, web server 110 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. For example, web server 110 may be configured to receive a job request, divide the job request into a plurality of job stages, assign stage weights to each job stage, and assign each job stage to a job queue, as discussed further herein. Web server 110 may transmit data and communicate with resource manager 140 over a hypertext transfer protocol (HTTP), a secure hypertext transfer protocol (HTTPS), and/or through any other suitable method or protocol. Web server 110 may transmit data and communicate with distributed file system 150 over a secure network protocol, such as, for example secure shell (SSH).

In various embodiments, distributed file system 150 may comprise any suitable big data environment, a distributed file system (DFS), and/or the like. For example, distributed file system 150 may comprise a distributed computing cluster configured for parallel processing and storage. The distributed computing cluster may comprise a plurality of nodes in electronic communication with each of the other nodes, as well as a control node. Processing jobs may be split among the nodes (formed as virtual or logical queues comprising one or more nodes) of the distributed computing cluster to improve throughput and enhance storage capacity. Distributed file system 150 may process hundreds of thousands of records from a single data source. Distributed file system 150 may also ingest data from hundreds of data sources. In various embodiments, distributed file system 150 may be a Hadoop® distributed file system (HDFS) as specified by the Apache Software Foundation at http://hadoop.apache.org/docs/. The HDFS may support a distributed computing cluster that may be, for example, a Hadoop® cluster configured to process and store big data sets with some of the nodes comprising a distributed storage system and some of the nodes comprising a distributed processing system. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

In various embodiments, resource manager 140 may be in electronic communication with web server 110 and/or distributed file system 150. Resource manager 140 may comprise any suitable combination of hardware, software, databases, or the like. Resource manager 140 may be configured to monitor and track resources in distributed file system 150 (e.g., node cluster 275, with brief reference to FIG. 2), and provide resource data to web server 110, as discussed further herein. System 100 may comprise any number of resource managers 140, such as, for example, one resource manager 140 for each node cluster in distributed file system 150. Resource manager 140 may be an Apache YARN® (Yet Another Resource Negotiator) cluster resource manager configured to monitor computation resources (e.g., CPUs, memory, etc.) needed to execute jobs, applications, or the like in distributed file system 150, and store data regarding computation resources in infrastructure capability database 235, as discussed further herein.

Figure 2:
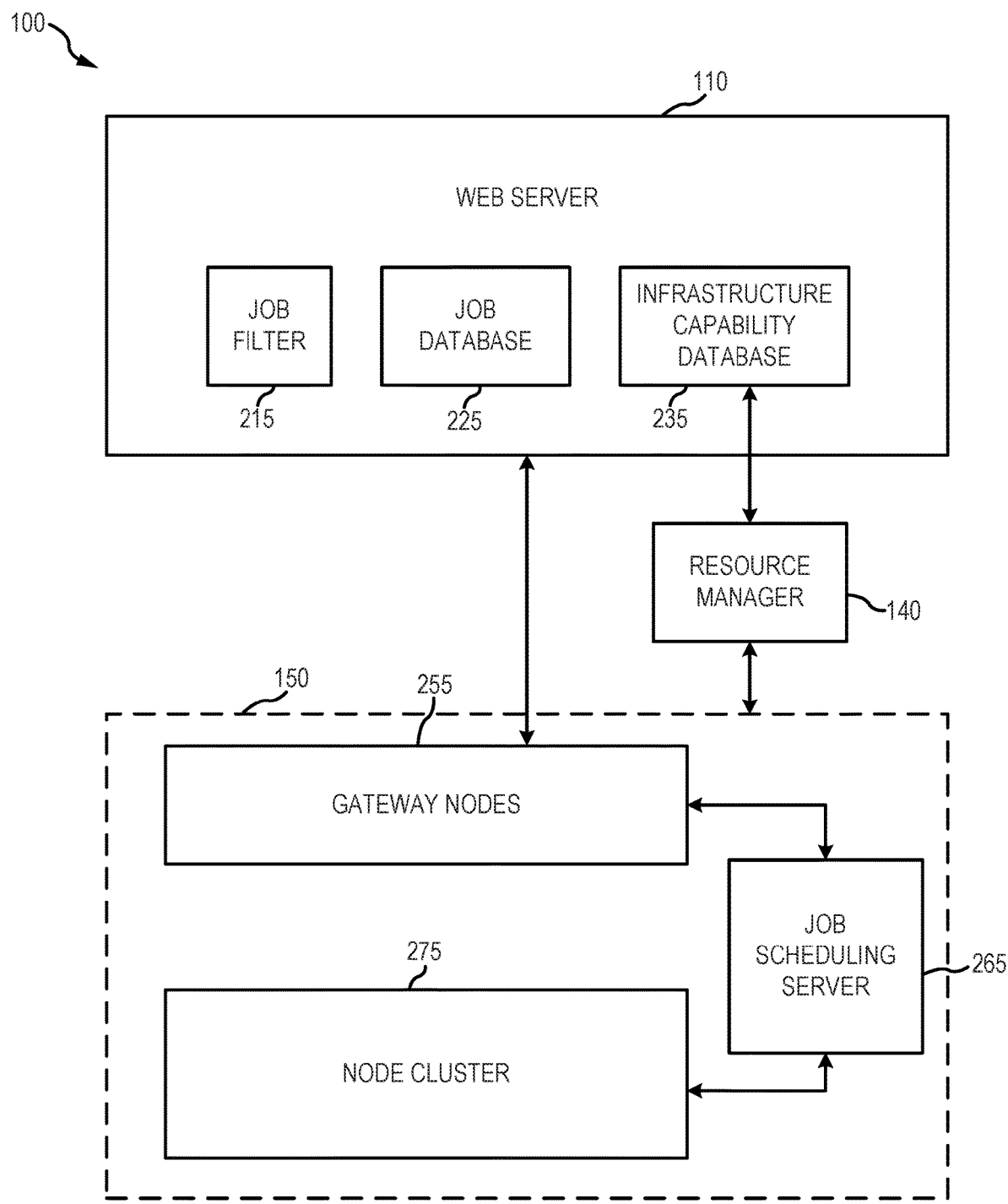
FIG. 2 is a block diagram illustrating various components of a web server and a distributed file system for use in a system for allocating jobs in a distributed file system queue, in accordance with various embodiments.

In various embodiments, and with reference to FIG. 2, exemplary architecture of web server 110 and distributed file system 150 are depicted in greater detail. Web server 110 may be configured to receive a job request. The job request may be received from a user input (e.g., via a user device), and/or through any other suitable input. The job request may also be generated by another system, such as, for example, as a monthly report or the like requiring the execution of one or more jobs. Each job request may comprise instructions to process data in distributed file system 150 such as, for example, during the creation and/or sending of data, formatting of data, statistical and/or analytical analysis of data, and/or the like. For example, the job request may comprise a data processing algorithm, a machine learning model, a statistical model, or the like configured to process data stored in distributed file system 150. Each job request may comprise a unique job identifier (e.g., a job ID, etc.).

In various embodiments, web server 110 may comprise one or more of a job filter 215, a job database 225, and/or an infrastructure capability database 235. Job filter 215 may be configured to divide job request into one or more job stages (e.g., a first job stage, a second job stage, etc.). Each job stage may comprise a logical division of the job request. For example, in response to the job request comprising a data processing request, a first job stage may be retrieving the requested data, a second job stage may be preprocessing the retrieved data, a third job stage may be processing the data (e.g., executing a data processing algorithm, model, etc.), a fourth job stage may be post-processing the processed data, and/or a fifth job stage maybe generating a data output based on the post-processed data. In various embodiments, job filter 215 may also automate the division of job requests into one or more job stages, such as, for example, based on the interdependencies of steps to be executed, whether any step can be execute independently, the complexity of steps, and/or using any other suitable factors.

Job filter 215 may retrieve job metadata corresponding to the job request to determine the division of the job request into one or more job stages (e.g., based on the unique job identifier). For example, job database 225 may be configured to store job metadata. Job database 225 may comprise any suitable type of database or data structure, and may be configured to store and maintain the job metadata. The job metadata may comprise data regarding the job request, such as, for example, the number of job stages in the job request, data regarding each job stage, and the like. The job metadata may also comprise data regarding each job stage of the job request, such as, for example, a job stage completion time (e.g., in minutes, hours, etc.), a job stage required memory (GB), a job stage data output size (GB), a job stage data output network flow (GB), a job stage dependency (e.g., stage 2 cannot be started until stage 1 is completed), the nature of the job stage (e.g., an IO bound job, a CPU heavy job, a scoring heavy job, etc.), historical statistics, and the like. For example, a first stage of a given job request may take five hours to complete, require 7000 GB of memory, output 20 GB of data, require 2000 GB of network resource consumption, and may not be dependent on another job stage in the job request.

In various embodiments, job filter 215 may also be configured to determine and assign a stage weight for each job stage. The stage weight may comprise any suitable scale (e.g., 1 to 5, 1 to 100, etc.). For example, wherein every stage of the job request is dependent on a stage 1, stage 1 may be assigned a high stage weight (e.g., 5, 100, etc.). The stage weight may also be based on the job stage metadata, such as, for example, the job stage completion time, the job stage required memory, the job stage data output size, the job stage data output network flow, and/or the job stage dependency. For example, each job stage metadata may be individually assigned a weight, and an average weighted mean may be calculated based on the job stage metadata. As an example, a job stage completion time of two hours may be assigned a weight of 2 (out of 5), a job stage required memory of 1000 GB may be assigned a weight of 2 (out of 5), a job stage data output size of 100 GB may be assigned a weight of 2 (out of 5), and/or a job stage data output network flow of 20 GB may be assigned a weight of 1 (out of 5), calculating an average weighted mean of 4 (e.g., the stage weight).

In various embodiments, web server 110 may also be configured to determine a queue capacity. For example, infrastructure capability database 235 may be configured to store data regarding the queue capacity. Infrastructure capability database 235 may comprise any suitable type of database or data structure and may be configured to store and maintain data regarding the queue capacity, such as, for example, current queue resource availability (e.g., computing resources, network resources, etc.), the number of jobs currently being executed (across all queues or queue-specific), historical job request execution statistics, and the like. For example, and in accordance with various embodiments, the historical job request execution statistics may capture data regarding each job and/or job stage that is executed, such as CPU memory taken by the job, time taken to complete the job, data output created by the job, number of bytes written by mappers and reducers, network flow needed by the job, etc. The queue capacity data may be captured by resource manager 140 in real time (or according to any time interval) and updated in infrastructure capability database 235. For example, and in accordance with various embodiments, the data may be captured by a node cluster web service API that provides resource data regarding the number of jobs currently being executed, the number of jobs pending execution, CPU usages of jobs being executed, the number of memory cores allocated to each job being executed, and the like.

Based on the job metadata and stage weight assigned to each stage and the current queue capacity, web server 110 may assign a job queue to each job stage. For example, and in accordance with various embodiments, the job stage having the greatest stage weight may be assigned to the job queue having the greatest queue resource capacity, and each job stage may be assigned in descending order based on job stage weight. The job queue assignment may comprise a queue identifier (e.g., a queue ID, the IP address of the queue, etc.). Web server 110 may transmit each job stage and corresponding job queue assignment to distributed file system 150, as discussed further herein.

In various embodiments, distributed file system 150 may comprise one or more of gateway nodes 255, a job scheduling server 265, and node cluster 275. Gateway nodes 255 and the nodes in node cluster 275 (e.g., nodes 393-1, 393-2, 393-3, 393-4, 393-5, 393-6, 393-7, 393-8, and/or 393-9, with brief reference to FIG. 3) may comprise any devices capable of receiving and/or processing data. For example, gateway nodes 255 and the nodes in node cluster 275 may take the form of a computer or processor, or a set of computers and/or processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.), tablets, wearables (e.g., smart watches, smart glasses, etc.), or any other device capable of receiving data over the network. Gateway nodes 255 (or dedicated edge nodes) may be configured as a gateway to distributed file system 150. For example, gateway nodes 255 may enable web server 110 to interact with, and transmit and receive data from, job scheduling server 265.

In various embodiments, job scheduling server 265 may be configured to manage and transfer jobs to one or more job queues in distributed file system 150. For example, job scheduling server 265 may comprise an Apache Oozie® server configured to manage and execute jobs and/or job stages received from web server 110. Job scheduling server 265 may receive one or more job stages and job queue assignments from web server 110, via gateway nodes 255. Based on the job queue assignments, job scheduling server 265 may transmit the job stage to the assigned job queue for execution. In response to the execution of each job stage completing, job scheduling server 265 may transmit a job completion notification to web server 110, via gateway nodes 255.

Figure 3:
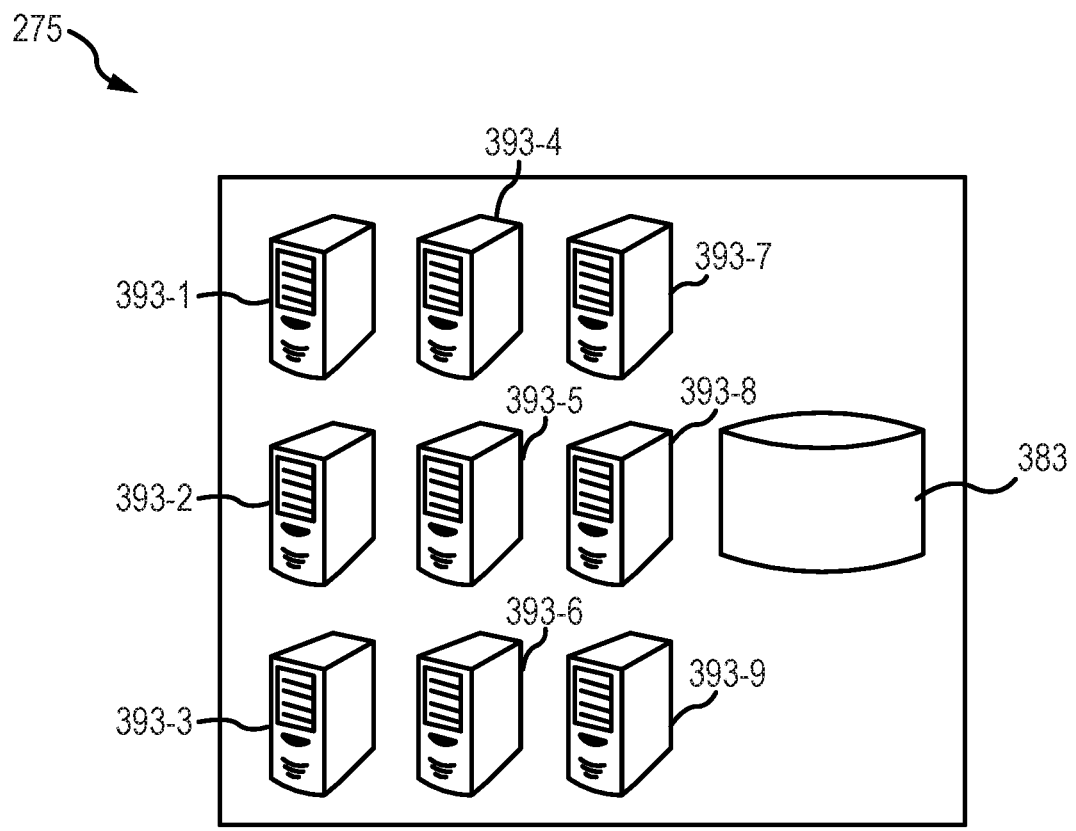
FIG. 3 is a block diagram illustrating various components of a node cluster in a distributed file system for use in a system for allocating jobs in a distributed file system queue, in accordance with various embodiments.

In various embodiments, and with reference to FIG. 3, an exemplary node cluster 275 is depicted in greater detail. Node cluster 275 may comprise one or more nodes 393-1, 393-2, 393-3, 393-4, 393-5, 393-6, 393-7, 393-8, and/or 393-9. Each node 393-1, 393-2, 393-3, 393-4, 393-5, 393-6, 393-7, 393-8, 393-9 may be logically and/or virtually assigned to a job queue for data processing. As an example, nodes 393-1, 393-2, and 393-3 may be assigned to a first job queue, nodes 393-4, 393-5, and 393-6 may be assigned to a second job queue, nodes 393-7 and 393-8 may be assigned to a third job queue, node 393-9 may be assigned to a fourth job queue, and/or any other suitable or desired node assignment. Nodes 393-1, 393-2, 393-3, 393-4, 393-5, 393-6, 393-7, 393-8, and/or 393-9 may also be part of multiple job queues to share resources (e.g., a node 393-1 may be part of a first job queue and a second job queue). Each job queue may leverage the resources of the nodes contained therein to execute jobs and job stages, as discussed further herein.

Node cluster 275 may comprise a data warehouse 383. Data warehouse 383 may support data summarization, query, and analysis of warehoused data. For example, data warehouse 383 may be an Apache Hive® data warehouse build on Apache Hadoop® infrastructure. Data warehouse 383 may facilitate nodes 393-1, 393-2, 393-3, 393-4, 393-5, 393-6, 393-7, 393-8, and/or 393-9 reading, writing, and managing large datasets residing in distributed storage in distributed file system 150. For example, data warehouse 383 may allow for interaction with the data using a structured query language such as HiveQL (HQL).

Figure 4:
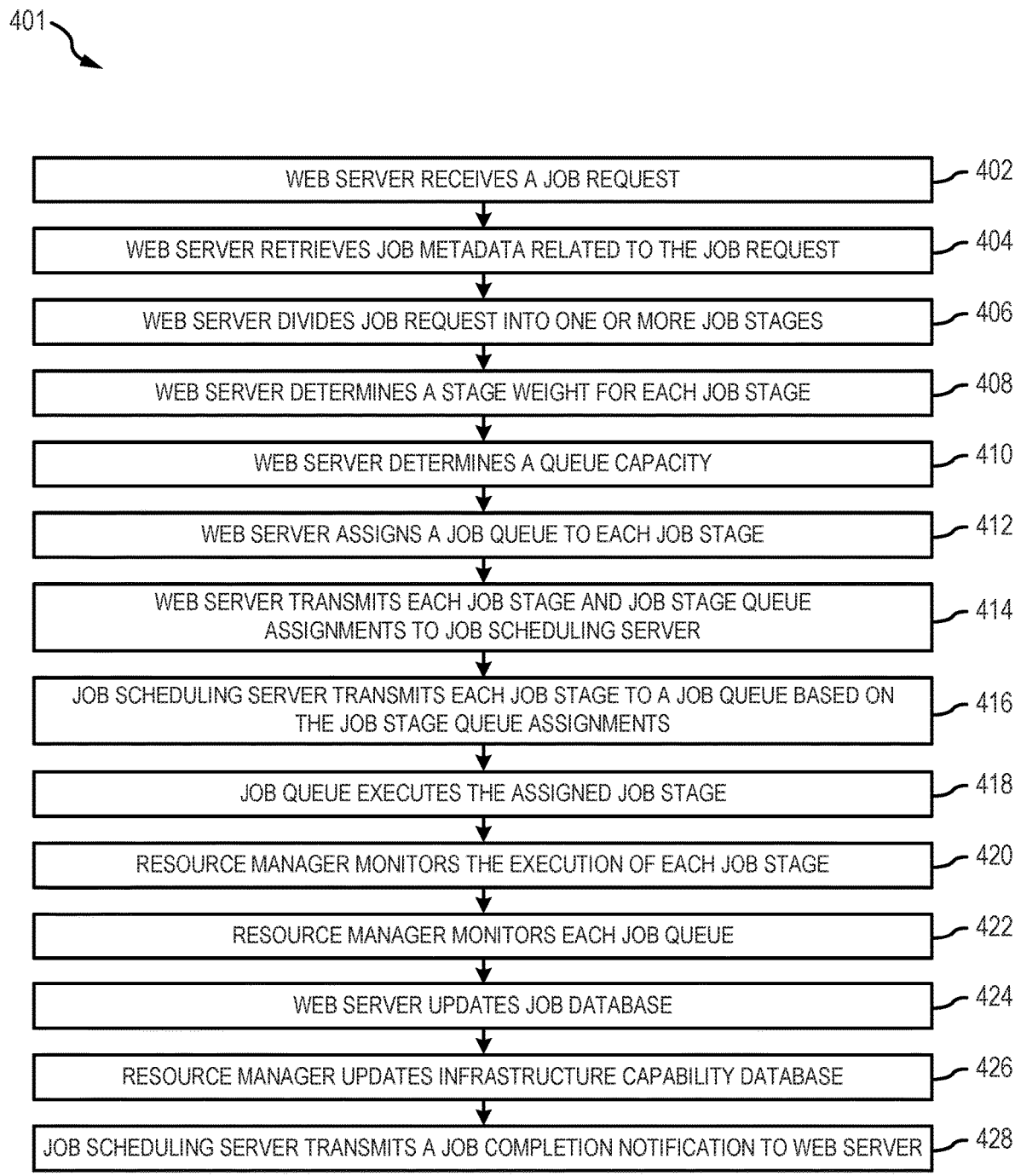
FIG. 4 illustrates a process flow for a method of allocating jobs in a distributed file system queue, in accordance with various embodiments.

Referring now to FIG. 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIG. 4, but also to the various system components as described above with reference to FIGS. 1-3.

In various embodiments, a method 401 for allocating jobs in a distributed file system queue is disclosed. Web server 110 receives a job request (step 402). The job request may comprise a data processing request to be performed using data from distributed file system 150, such as, for example, a statistical model, a machine learning model or algorithm, a data processing algorithm, or the like. The job request may comprise a job identifier (e.g., a job ID) and may identify data or data sources needed for the request. For example, and in accordance with various embodiments, the data and/or data sources may be defined by the user submitted the job request. Web server 110 may receive the request from any suitable source, such as, for example, from a user device, a computer-based system, or the like. Web server 110 retrieves job metadata related to the job request (step 404) from job database 225. Web server 110, via job filter 215, may retrieve the job metadata associated with the job request by querying the job database 225 based on the job identifier. The job metadata may comprise data regarding the job request, such as, for example, the number of job stages (e.g., stage 1, stage 2, etc.) in the job request, and the like. The job metadata may also comprise data regarding each job stage of the job request, such as, for example, a job stage completion time, a job stage required memory, a job stage data output size, a job stage data output network flow, a job stage dependency (e.g., stage 2 cannot be started until stage 1 is completed), and the like. In various embodiments, the job metadata may be automatically generated and updated based on historical measurements of each job stage being executed over time. In various embodiments, the job metadata may also be originally defined by a user, or defined using an approximated value, and may be updated over time based on historical data.

In various embodiments, web server 110 divides job request into one or more job stages (step 406). Web server 110, via job filter 215, may divide the job request into one or more job stages based on the job metadata retrieved in step 404 (e.g., as specified by the job metadata). Web server 110 determines a stage weight for each job stage (step 408). The stage weight may be based on the job stage metadata, such as, for example, the job stage required memory, the job stage data output size, the job stage data output network flow, and/or the job stage dependency. The stage weight may comprise any suitable scale (e.g., 1 to 5, 1 to 100, etc.). For example, wherein every stage of the job request is dependent on a stage 1, stage 1 may be assigned a high stage weight (e.g., 5, 100, etc.).

Web server 110 determines a queue capacity (step 410). Web server 110 may query infrastructure capability database 235 to retrieve data regarding the queue capacity. For example, infrastructure capability database 235 may contain data regard current queue resource availability, the number of jobs currently being executed (across all queues or queue-specific), historical job request execution statistics, or the like. Web server 110, via job filter 215, assigns a job queue to each job stage (step 412) based on the job metadata, the stage weight, and the queue capacity. For example, job stages having a high stage weight or requiring a high amount of resources to complete may be assigned to a job queue having a high resource availability. As a further example, job stages having a low stage weight or requiring a low amount of resources to complete may be assigned to a job queue having limited availability with low resource availability. Web server 110 transmits each job stage and job stage queue assignment to job scheduling server 265 (step 414), via gateway nodes 255.

In response to receiving the job stages and job stage queue assignments, job scheduling server 265 may delegate the job stages across job queues in node cluster 275. For example, job scheduling server 265 transmits each job stage to a job queue based on the job stage queue assignments (step 416). Job scheduling server 265 may transmit each job stage in order of the stage weight (e.g., highest stage weight to lowest stage weight), or using any other system or process. Each job queue executes the assigned job stage (step 418). For example, the cluster nodes (e.g., nodes 393-1, 393-2, 393-3, 393-4, 393-5, 393-6, 393-7, 393-8, and/or 393-9) logically assigned to each job queue may execute the job stage by retrieving the specified data, processing the retrieved data, performing operations, and/or the like specified by each job stage.

In various embodiments, resource manager 140 monitors the execution of each job stage (step 420) and monitors each job queue (step 422). For example, resource manager 140 may monitor the execution of each job stage to collect data on the execution, such as, for example, the job stage completion time, the job stage required memory, the job stage data output size, the job stage data output network flow, or the like. Resource manager 140 may monitor each job queue to determine the current queue resource availability, the number of job requests currently being executed, and the like, and may generate data based on the monitoring. Web server 110 updates job database 225 (step 424) based on monitoring the execution of each job stage. For example, resource manager 140 may transmit the execution data to web server 110, and web server 110 may update job database 225, based on the job identifier, to comprise the newly collected data. For example, each entry in job database 225 may comprise a mathematical average of data points (e.g., the job stage completion time is an average of the historical amount of time the job stage takes until completion). Web server 110 may update job database 225 by calculating and storing a new average of each data point, based on the data gathered in step 420. Resource manager 140 updates infrastructure capability database 235 (step 426) based on monitoring each job queue. Resource manager 140 may update infrastructure capability database 235 to include data gathered during step 422, such as, for example, the current queue resource availability, the current number of job requests being execute, and the historical job request execution statistics.

In various embodiments, in response to each job stage completing, job scheduling server 265 transmits a job completion notification to web server 110 (step 428). The job completion notification may comprise the data output from the job request. The job completion notification may be formatted according to the job request, such as for example, as processed in accordance with a job stage.

The disclosure and claims do not describe only a particular outcome of allocating jobs to queues in a distributed file system, but the disclosure and claims include specific rules for implementing the outcome of allocating jobs to queues in a distributed file system and that render information into a specific format that is then used and applied to create the desired results of allocating jobs to queues in a distributed file system, as set forth in *McRO, Inc. v. Bandai Namco Games America Inc*. (Fed. Cir. case number 15-1080, Sep. 13, 2016). In other words, the outcome of allocating jobs to queues in a distributed file system can be performed by many different types of rules and combinations of rules, and this disclosure includes various embodiments with specific rules. While the absence of complete preemption may not guarantee that a claim is eligible, the disclosure does not sufficiently preempt the field of allocating jobs to queues in a distributed file system at all. The disclosure acts to narrow, confine, and otherwise tie down the disclosure so as not to cover the general abstract idea of just allocating jobs to queues in a distributed file system. Significantly, other systems and methods exist for allocating jobs in a distributed file system, so it would be inappropriate to assert that the claimed invention preempts the field or monopolizes the basic tools of allocating jobs to queues in a distributed file system. In other words, the disclosure will not prevent others from allocating jobs to queues in a distributed file system, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components may include any suitable processor, or the like, such as application specific integrated circuits (ASICs). Implementation of the hardware machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IDS®, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), or any other suitable database product. Moreover, the databases may be organized in any suitable manner, for example, as data tables or lookup tables. Each record may be a single file, a series of files, a linked series of data fields. or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks (e.g., method 401, with brief reference to FIG. 4).

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nutjten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a web server, a job request;
dividing, by the web server, the job request into a plurality of job stages based on job metadata, wherein each job stage comprises a logical partition of the job request;
determining, by the web server, a stage weight for each job stage and an infrastructure capability, wherein the stage weight is based on the job metadata;
assigning, by the web server, each job stage to a job queue based on the stage weight and the infrastructure capability; and
transmitting, by the web server in electronic communication with a distributed file system, each job stage and associated job queue assignment to a job scheduling server, wherein the job scheduling server is configured to transfer each job stage to a job queue based on the job queue assignment.

2. The method of claim 1, wherein a resource manager monitors execution of each job stage to determine at least one of a job stage completion time, a job stage required memory, a job stage data output size, or a job stage data output network flow.

3. The method of claim 2, wherein the job metadata comprises at least one of a job stage dependency, the job stage completion time, the job stage required memory, the job stage data output size, or the job stage data output network flow.

4. The method of claim 1, wherein the resource manager monitors each job queue during execution of the assigned job stage to determine at least one of a current queue resource availability or a number of jobs being executed on each job queue.

5. The method of claim 4, wherein the infrastructure capability comprises at least one of the current queue resource availability or the number of jobs being executed on each job queue.

6. The method of claim 1, wherein each job queue comprises a computing node in the distributed file system.

7. The method of claim 1, wherein the job request comprises a data processing algorithm, a machine learning model, or a statistical model.

8. A computer-based system comprising:
a processor,
a tangible, non-transitory memory configured to communicate with the processor,
the tangible, non-transitory memory having instructions stored thereon that, in response to execution by the processor, cause the processor to perform operations comprising:
receiving, by the processor, a job request;
dividing, by the processor, the job request into a plurality of job stages based on job metadata, wherein each job stage comprises a logical partition of the job request;
determining, by the processor, a stage weight for each job stage and an infrastructure capability, wherein the stage weight is based on the job metadata;
assigning, by the processor, each job stage to a job queue based on the stage weight and the infrastructure capability; and
transmitting, by the processor in electronic communication with a distributed file system, each job stage and associated job queue assignment to a job scheduling server, wherein the job scheduling server is configured to transfer each job stage to a job queue based on the job queue assignment.

9. The system of claim 8, wherein a resource manager monitors execution of each job stage to determine at least one of a job stage completion time, a job stage required memory, a job stage data output size, or a job stage data output network flow.

10. The system of claim 9, wherein the job metadata comprises at least one of a job stage dependency, the job stage completion time, the job stage required memory, the job stage data output size, or the job stage data output network flow.

11. The system of claim 8, wherein the resource manager monitors each job queue during execution of the assigned job stage to determine at least one of a current queue resource availability or a number of jobs being executed on each job queue.

12. The system of claim 11, wherein the infrastructure capability comprises at least one of the current queue resource availability or the number of jobs being executed on each job queue.

13. The system of claim 8, wherein each job queue comprises a computing node in the distributed file system.

14. The system of claim 8, wherein the job request comprises a data processing algorithm, a machine learning model, or a statistical model.

15. An article of manufacture including a non-transitory, tangible computer readable storage medium having instructions stored thereon that, in response to execution by a computer based system, cause the computer based system to perform operations comprising:
receiving, by the computer based system, a job request;
dividing, by the computer based system, the job request into a plurality of job stages based on job metadata, wherein each job stage comprises a logical partition of the job request;
determining, by the computer based system, a stage weight for each job stage and an infrastructure capability, wherein the stage weight is based on the job metadata;
assigning, by the computer based system, each job stage to a job queue based on the stage weight and the infrastructure capability; and
transmitting, by the computer based system in electronic communication with a distributed file system, each job stage and associated job queue assignment to a job scheduling server, wherein the job scheduling server is configured to transfer each job stage to a job queue based on the job queue assignment.

16. The article of manufacture of claim 15, wherein a resource manager monitors execution of each job stage to determine at least one of a job stage completion time, a job stage required memory, a job stage data output size, or a job stage data output network flow.

17. The article of manufacture of claim 15, wherein the job metadata comprises at least one of a job stage dependency, the job stage completion time, the job stage required memory, the job stage data output size, or the job stage data output network flow.

18. The article of manufacture of claim 15, wherein the resource manager monitors each job queue during execution of the assigned job stage to determine at least one of a current queue resource availability or a number of jobs being executed on each job queue.

19. The article of manufacture of claim 18, wherein the infrastructure capability comprises at least one of the current queue resource availability or the number of jobs being executed on each job queue.

20. The article of manufacture of claim 15, wherein each job queue comprises a computing node in the distributed file system, and wherein the job request comprises a data processing algorithm, a machine learning model, or a statistical model.

\* \* \* \* \*